(12) United States Patent
Ito et al.

(10) Patent No.: US 9,547,283 B2
(45) Date of Patent: Jan. 17, 2017

(54) ELECTRONIC DEVICE, TIME SETTING METHOD, TIME SETTING SYSTEM AND PROGRAM

(71) Applicant: Sony Corporation, Tokyo (JP)

(72) Inventors: Ryogo Ito, Tokyo (JP); Kazuma Akamatsu, Tokyo (JP); Megumi Takagi, Kanagawa (JP); Shunsuke Katsumata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/207,613

(22) Filed: Jul. 12, 2016

(65) Prior Publication Data

US 2016/0320757 A1 Nov. 3, 2016

Related U.S. Application Data

(63) Continuation of application No. 14/249,414, filed on Apr. 10, 2014, now Pat. No. 9,412,207.

(60) Provisional application No. 61/878,966, filed on Sep. 17, 2013.

(51) Int. Cl.
*G04R 20/26* (2013.01)
*H04N 5/232* (2006.01)
*H04N 21/254* (2011.01)

(52) U.S. Cl.
CPC .......... *G04R 20/26* (2013.01); *H04N 5/23203* (2013.01); *H04N 21/2542* (2013.01)

(58) Field of Classification Search
CPC .......... G04C 1/10; G04R 20/26; H04N 21/00; H04N 21/2542; H04N 5/23203
See application file for complete search history.

(56) References Cited

U.S. PATENT DOCUMENTS

| | | | |
|---|---|---|---|
| 6,359,837 B1 * | 3/2002 | Tsukamoto | G03B 17/24 368/10 |
| 7,474,651 B2 * | 1/2009 | Ozawa | G04G 5/002 327/156 |
| 2003/0193583 A1 | 10/2003 | Shimakura | |
| 2004/0190379 A1 * | 9/2004 | Akiba | G04G 5/002 368/47 |
| 2005/0135194 A1 * | 6/2005 | Ishii | G04R 20/02 368/47 |
| 2009/0129206 A1 * | 5/2009 | Baba | G01S 19/34 368/14 |
| 2009/0180355 A1 * | 7/2009 | Cartwright | G04G 21/00 368/12 |
| 2009/0219205 A1 * | 9/2009 | Jazra | G04G 5/002 342/357.64 |
| 2012/0213040 A1 * | 8/2012 | Nakagawa | G04G 9/0005 368/67 |

* cited by examiner

*Primary Examiner* — Vit W Miska
(74) *Attorney, Agent, or Firm* — Oblon, McClelland, Maier & Neustadt, L.L.P.

(57) ABSTRACT

An electronic device includes a communication unit that performs communication with an external apparatus; a timekeeping unit that performs timekeeping of time; and a control unit, after completion of a connection with the external apparatus using the communication unit, updates time of the timekeeping unit using time information when being in a state where time can be set by obtaining the time information from the external apparatus.

15 Claims, 9 Drawing Sheets

ELECTRONIC DEVICE, TIME SETTING METHOD, TIME SETTING SYSTEM AND PROGRAM

CROSS REFERENCE TO RELATED APPLICATIONS

This application is a continuation of U.S. patent application Ser. No. 14/249,414, filed Apr. 10, 2014, which claims the benefit of priority of Provisional Application Ser. No. 61/878,966, filed Sep. 17, 2013, the entire contents of each of which are incorporated herein by reference.

BACKGROUND

The present disclosure relates to an electronic device, a time setting method, a time setting system and a program, and enables the electronic device to easily perform time setting.

In the related art, in order to easily perform management or the like of a captured image, an electronic device with a timekeeping function, such as an imaging apparatus, records time information generated by the timekeeping function together with the captured image. In addition, Japanese Unexamined Patent Application Publication No. 2002-341068 (U.S. Patent publication No. 2003/0193583) discloses that the world standard time is calculated based on whether or not information indicates the set time, the set area and the Daylight Saving Time, and a server is accessed through a network using information of the calculated world standard time.

SUMMARY

When time setting of an electronic device is performed, for example, when the time setting is performed by a key manipulation, a complicated key manipulation is necessary for inputting the present time. In addition, the time setting frequency of the electronic device can be reduced by continually performing a timekeeping function regardless of an operation of the electronic device. However, in order to continually perform the timekeeping function, a power supply for performing the timekeeping function, such as a battery for the timekeeping function, has to be installed apart from a power supply for operating the electronic device.

Therefore, it is desirable to provide the electronic device, a time setting method, a time setting system, and a program that can easily perform the time setting.

According to an embodiment of the present disclosure, here is provided an electronic device including: a communication unit that performs communication with an external apparatus; a timekeeping unit that performs timekeeping of the time; and a control unit, after completion of a connection with the external apparatus using the communication unit, updates time of the timekeeping unit using time information when being in a state where time can be set by obtaining the time information from the external apparatus.

In the electronic device of this technology, the wireless communication with the external apparatus is performed, after a connection with the external apparatus is completed. For example, device information indicating that the electronic device is a device where time can be set is transmitted to the external apparatus, and the time information on the time is obtained from the external apparatus. In addition, in the electronic device, after the connection, for example, a first connection with the external apparatus is completed, when being in a state where the time can be set by obtaining the time information on the time from the external apparatus, the time of the timekeeping unit is automatically updated using the obtained time information. In addition, when the time indicated by the time information is not within a predetermined period, the time of the timekeeping unit is changed to a time specified in advance.

According to another embodiment of the present disclosure, here is provided a time setting method including: causing a control unit to form a connection with an external apparatus using a communication unit; causing the control unit to obtain time information supplied from the external apparatus after the connection with the external apparatus is completed; and causing the control unit to update time of a timekeeping unit that performs the timekeeping of the time using the time information, when being in a state where time can be set.

According to still another embodiment of the present disclosure, here is provided a time setting system including: an information processing apparatus that performs supplying time information; and an electronic device that performs time setting using the time information supplied from the information processing apparatus, in which the electronic device includes a communication unit that performs communication with the information processing apparatus; a timekeeping unit that performs the timekeeping of the time; and a control unit, after completion of a connection with the information processing apparatus using the communication unit, updates time of the timekeeping unit using time information when being in a state where time can be set by obtaining the time information supplied from the external apparatus.

According to still another embodiment of the present disclosure, there is provided a program that causes a computer to execute time setting of an electronic device including: forming a connection with an external apparatus using a communication unit; obtaining time information supplied from the external apparatus after the connection with the external apparatus is completed; and updating time of a timekeeping unit that performs the timekeeping of the time using the time information, when being in a state where time can be set by obtaining the time information.

In addition, the program according to an embodiment of the present technology is a program which can be provided to, for example, a general-purpose computer which can execute various program codes, by a storage medium which is provided in a computer-readable format, a communication medium, for example a storage medium such as an optical disk, a magnetic disk, or a semiconductor memory, or another communication medium such as a network. Such a program is provided in the computer-readable format, whereby processing according to the program is realized on the computer.

According to an embodiment of the present technology, the electronic device is connected to the external apparatus using the communication unit, and after the connection with the external apparatus is completed, the time information on the time supplied from the external apparatus is obtained. In addition, when being in a state where the time can be set, the electronic device automatically updates the time of the timekeeping unit which performs the timekeeping of the time, using the obtained time information. Thus, the time setting of the electronic device can be easily performed. In addition, advantages described in the present specification are merely exemplified, and are not limited to those exemplified. Also there may be an additional advantage.

DETAILED DESCRIPTION OF EMBODIMENTS

Hereinafter, an embodiment for realizing the present technology will be described. In addition, the description will be made in the following order.

Figure 1:
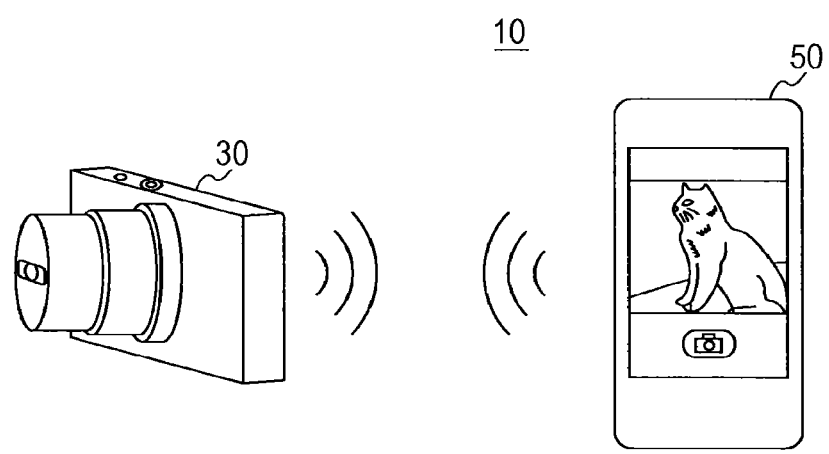
FIG. 1 is a diagram exemplifying a configuration of a time setting system.

1. Configuration of Time Setting System
2. Functional Configuration of Electronic Device
3. Operation of Time Setting System
3-1. With Regard to Link between Electronic Device with Information Processing Apparatus
3-2. With Regard to Time Setting Operation
3-3. With Regard to Another Time Setting Operation
1. Configuration of Time Setting System FIG. 1 is a diagram exemplifying a configuration of a time setting system. A time setting system 10 is configured with an electronic device 30 and an information processing apparatus 50. The electronic device 30 is a device which uses time information. For example, the electronic device 30 can use an imaging apparatus which records captured images together with time information, and a video apparatus or an audio apparatus which performs recording reproduction of video or audio using the time information, as the electronic device of the present technology. In addition, the electronic device 30 includes wireless communication function, and performs time setting using the time information obtained from the information processing apparatus 50 using a wireless communication with the information processing apparatus 50. The information processing apparatus 50 includes the time information and the wireless communication function, and for example, a cellular phone, a smart phone, a tablet terminal, a notebook computer or the like, can be used as the information processing apparatus of the present technology. The information processing apparatus 50 performs the wireless communication with the electronic device 30, and supplies the time information to the electronic device 30. Hereinafter, for example, a case where the imaging apparatus is used as the electronic device will be described.

2. Functional Configuration of Electronic Device

Figure 2:
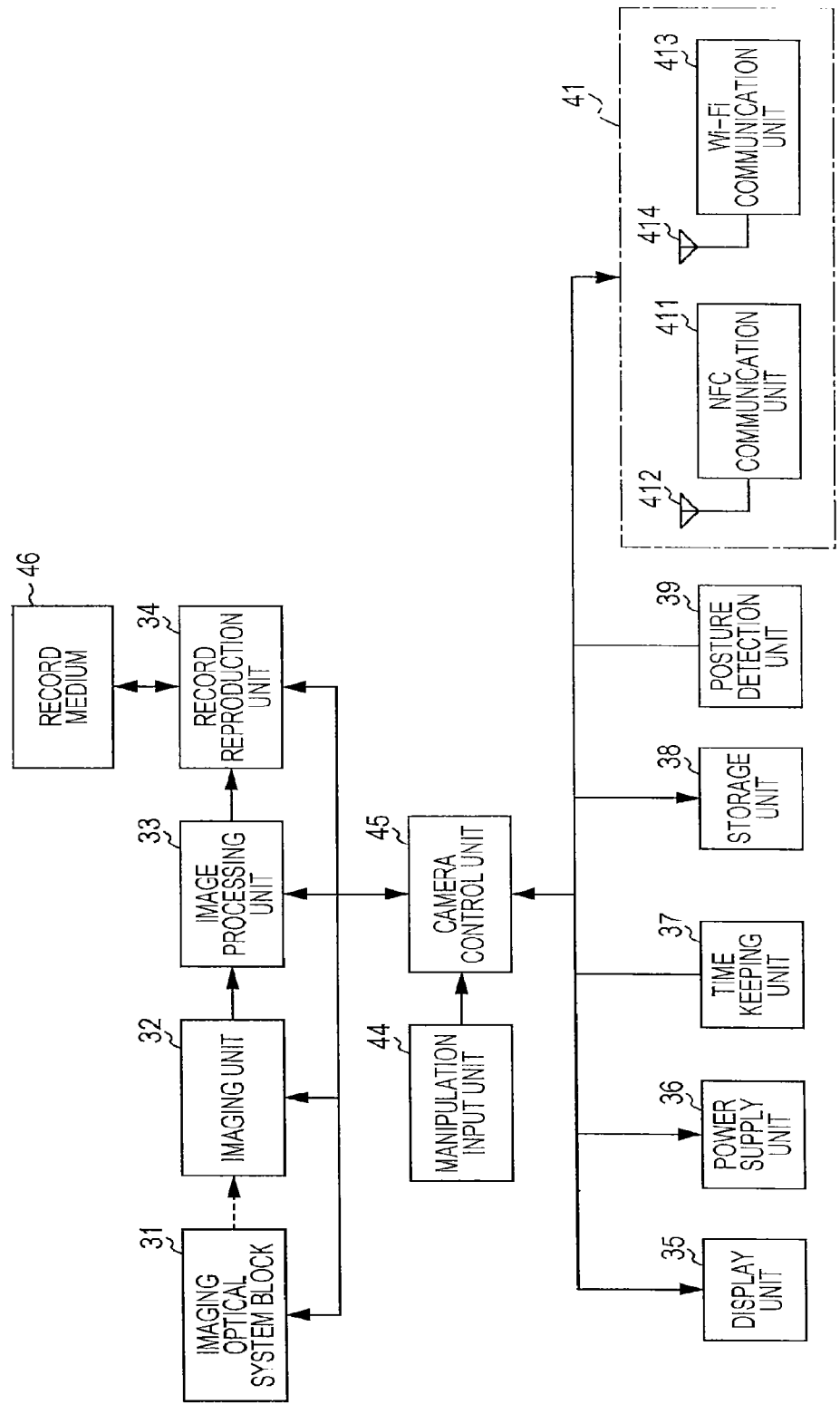
FIG. 2 is a block diagram exemplifying a functional configuration of an electronic device.

FIG. 2 is a block diagram exemplifying a functional configuration of the electronic device. The electronic device 30 includes an imaging optical system block 31, an imaging unit 32, an image processing unit 33, a record reproduction unit 34, a display unit 35, a power supply unit 36, a timekeeping unit 37, a storage unit 38, a posture detection unit 39, a wireless communication unit 41, a manipulation input unit 44, and a camera control unit 45. In addition, in the electronic device 30, a record medium 46 is detachably installed.

The imaging optical system block 31 includes a lens group configured with a focus lens, a zoom lens and the like, an aperture adjustment mechanism, and a driving unit which drives the lens group or the aperture adjustment mechanism. In addition, the imaging optical system block 31 may include a shutter mechanism, a camera shake correction mechanism or the like.

The imaging unit 32 is configured with an imaging apparatus such as a CCD (Charge Coupled Device) or a CMOS (Complementary Metal Oxide Semiconductor). The imaging unit 32 converts an object optical image formed by the imaging optical system block 31 into an image signal. The imaging unit 32 outputs the image signal generated using a photoelectric conversion to the image processing unit 33.

The image processing unit 33 performs various kinds of signal processing with respect to the image signal output from the imaging unit 32. For example, the image processing unit 33 performs noise elimination, color correction, edge detection or the like when necessary. The image processing unit 33 outputs the processed image signal to the record reproduction unit 34.

The record reproduction unit 34 performs recording of the captured image and reproduction of the captured image which is recorded, using the record medium 46. The record reproduction unit 34 records the image signal of a still image or a moving image processed by the image processing unit 33 after being generated by the imaging unit 32 in the record medium 46. In addition, the record reproduction unit 34 reads out the image signal which performs the reproduction of the still image or the moving image which is recorded in the record medium 46. In addition, the record reproduction unit 34 may record the image signal obtained before being processed by the image processing unit 33 in the record medium 46. In addition, the record reproduction unit 34 may perform encoding processing which compresses an amount of a signal of the image signal recorded in the record medium 46, and decoding processing of the encoded data recorded in the record medium 46. Furthermore, the record reproduction unit 34 may record information indicating imaging time (date only, date and time point, or time point only) together with the still image or the moving image using the time information supplied from the timekeeping unit 37, in the record medium 46.

For example, the display unit 35 is configured with a liquid crystal display element or the like, and displays the mounted state of the record medium 46, a remaining amount of battery of the power supply unit 36 or the like.

The power supply unit 36 is configured with a battery and a power supply circuit. According to a control signal supplied from the camera control unit 45, the power supply unit 36 supplies electric power to each of the units of the electronic device 30. In addition, the power supply unit 36 supplies the electric power to the timekeeping unit 37 regardless of an operation of the electronic device 30.

The timekeeping unit 37 receives the electric power from the power supply unit 36, performs timekeeping, and outputs the time information indicating the present time to the record reproduction unit 34. In addition, the timekeeping unit 37 can update the present time under the control of the camera control unit 45.

The storage unit 38 is configured with a record medium or the like such as a RAM (Random Access Memory) and a ROM (Read Only Memory). For example, the RAM is used as a work area of the camera control unit 45. In addition, for example, in the ROM, a program or the like for executing various types of controls performed by the camera control unit 45 is stored. In addition, in the ROM or the RAM, control information or the like which is used for the various types of controls performed by the camera control unit 45 is stored.

The posture detection unit 39 performs detection of posture or a change in posture of the electronic device 30. The posture detection unit 39 is configured with a gravity sensor or a gyro sensor, a 3-axis acceleration sensor and the like, and detects the change in posture in a vertical direction or a horizontal direction of the electronic device 30, a rotation position or a change in rotation position of the electronic device 30 in which an optical axis of the imaging optical system block 31 is set as a rotation axis, or the like. The posture detection unit 39 outputs a posture detection signal to the camera control unit 45. In addition, if the posture detection signal is output together with an image signal of the captured image to the information processing apparatus 50, the captured image can be displayed in consideration of the posture of the electronic device 30. For example, when a generation of the captured image is performed in a state where the electronic device 30 tilts with respect to the horizontal direction, the information processing apparatus 50 displays an object which does not tilt with respect to the horizontal direction as tilted with respect to the horizontal direction. However, if tilting is corrected using the posture detection signal, the object which does not tilt with respect to the horizontal direction can be displayed correctly without being tilted.

The wireless communication unit 41 includes an NFC (Near Field Communication) communication unit 411, an NFC antenna 412, a Wi-Fi communication unit 413, and a Wi-Fi antenna 414.

The NFC communication unit 411 is an interface which performs a non-contact communication with an external apparatus (such as the information processing apparatus 50) which approaches the electronic device 30 in cooperation with the NFC antenna 412, under the control of the camera control unit 45. The NFC communication unit 411 transmits a radio wave which reaches a short distance of approximately 3 cm to 10 cm from the NFC antenna 412, or approximately 7 mm depending on design, and performs an NFC communication with the external apparatus within a radio wave arrival range. For example, the NFC communication unit 411 transmits connection information (Wi-Fi Configuration) for performing an automatic connection with Wi-Fi, or AAR (Android Application Record), according to a command (Check Command) of the external apparatus. In the connection information, an SSID (Service Set Identifier) for a Wi-Fi connection, a PassKey (encoding key), and the like are included.

The Wi-Fi communication unit 413 is an interface which performs the wireless communication with the external apparatus (such as the information processing apparatus 50) around the electronic device 30 in cooperation with the Wi-Fi antenna 414, under the control of the camera control unit 45. For example, the Wi-Fi communication unit 413 performs Wi-Fi certification and Wi-Fi communication connection establishment processing with regard to the external apparatus, according to a Wi-Fi connection request of the external apparatus.

The manipulation input unit 44 detects a manipulation input of a user, and outputs a manipulation signal to the camera control unit 45 according to the user's manipulation.

The camera control unit 45 executes the program stored in the storage unit 38, and generates the control signal based on the manipulation signal supplied from the manipulation input unit 44 or the control information stored in the storage unit 38. The camera control unit 45 outputs the generated control signal to each of the units of the electronic device 30, and performs a imaging control, an image processing control, a record reproduction control, and the like, in such a manner that the operation according to the user's manipulation is performed in the electronic device 30. In addition, the camera control unit 45 performs the wireless communication with the information processing apparatus 50 by controlling the NFC communication unit 411 and the Wi-Fi communication unit 413, and updates time of the timekeeping unit 37 based on the time information supplied from the information processing apparatus 50.

The record medium 46 is a memory card or the like in which the captured image or the like is recorded, and detachably installed.

Figure 3:
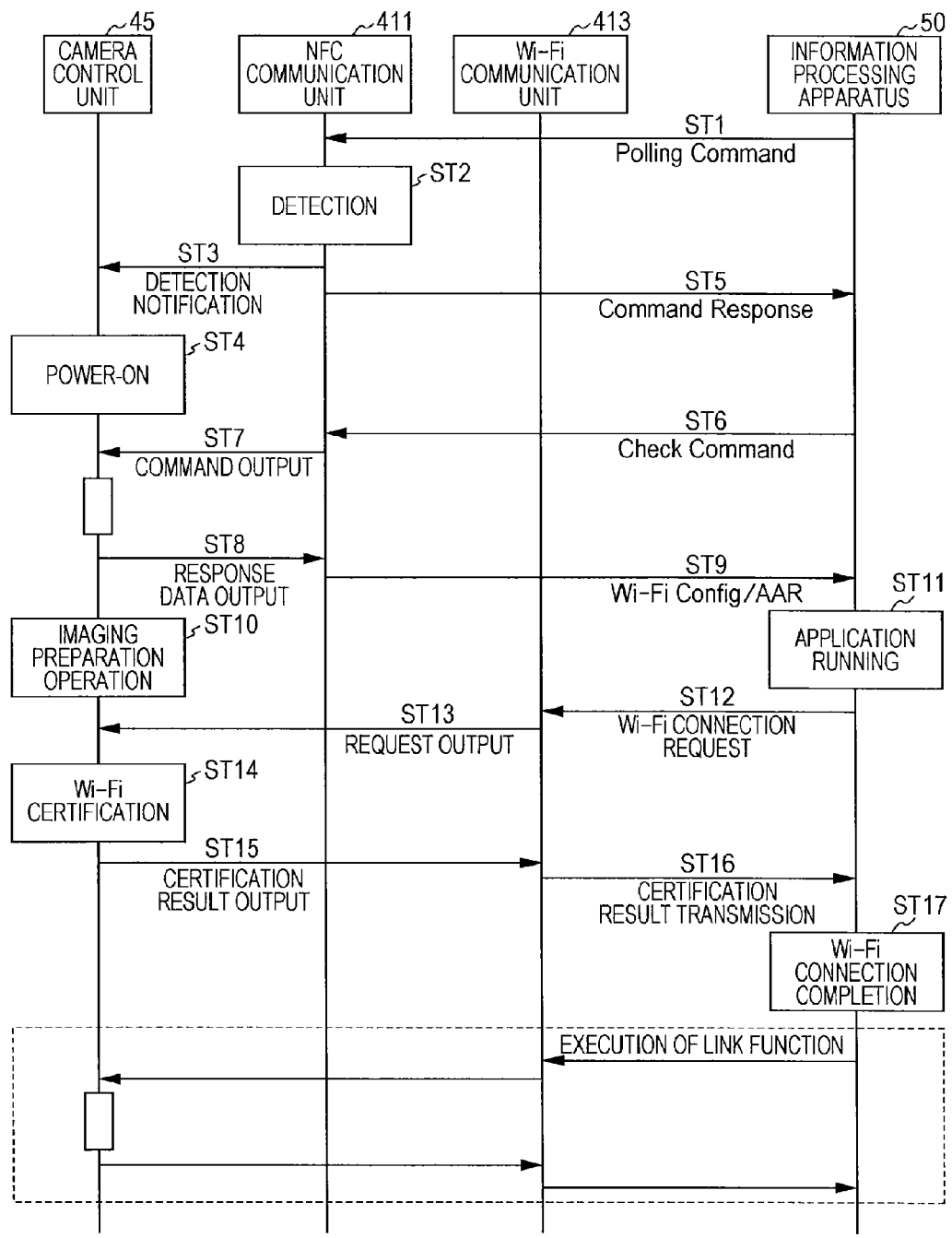
FIG. 3 is a sequence diagram illustrating processing until a link function of an electronic device and an information processing apparatus starts.

3. Operation of Time Setting System 3-1. With Regard to Link Between Electronic Device and Information Processing Apparatus Next, the operation of the time setting system will be described. FIG. 3 is a sequence diagram illustrating processing performed until the link function of the electronic device and the information processing apparatus starts, in the time setting system.

In step ST1, the information processing apparatus 50 transmits a Polling Command using the NFC communication. Here, if the NFC antenna of the electronic device 30 is included within a predetermined radio wave arrival range from the NFC antenna of the information processing apparatus 50, in step ST2, the NFC communication unit 411 of the electronic device 30 detects transmission of the Polling Command.

In step ST3, the NFC communication unit 411 of the electronic device 30 gives detection notification to the camera control unit 45 according to the detection of the NFC communication with the information processing apparatus 50.

In step ST4, the camera control unit 45 generates the control signal according to the detection notification of the NFC communication unit 411, outputs the generated control signal to the power supply unit 36, and thus performs a control to turn the power supply on.

In step ST5, the NFC communication unit 411 transmits a Command Response using the NFC communication, according to the detection of the NFC communication.

In step ST6, the information processing apparatus 50 detects the Command Response from the electronic device 30, thereby finding out an NFC communication partner. In order to obtain predetermined information, the information processing apparatus 50 transmits a Check Command.

In step ST7, the NFC communication unit 411 of the electronic device 30 outputs the Check Command received using the NFC communication to the camera control unit 45.

In step ST8, the camera control unit 45 outputs response data to the NFC communication unit 411, according to the Check Command. Here, in the response data, for example, Wi-Fi Config and AAR which are described above are included.

In step ST9, the NFC communication unit 411 transmits the response data to the information processing apparatus 50 using the NFC communication. In addition, the above-described steps ST6 to ST9 are performed a plurality of times, and the response data may be transmitted a plurality of times.

In step ST10, the camera control unit 45 performs an imaging preparation operation. The camera control unit 45 performs the preparation operation in such a manner that imaging can be performed in the electronic device 30. In addition, in the preparation operation, a preparation operation in which the electronic device 30 being in an image-capturable state can be identified may be performed. For example, when a collapsible lens is used as the imaging optical system block 31, the camera control unit 45 performs an operation to project the lens, an operation to output running sound or the like. In addition, the imaging preparation operation may be performed after the Wi-Fi connection is completed.

In step ST11, the information processing apparatus 50 makes a predetermined application run, according to the received AAR. For example, the predetermined application receives the image signal of the captured image transmitted from the electronic device 30 using the Wi-Fi communication, and performs processing to display the captured image.

In step ST12, the information processing apparatus 50 requests Wi-Fi connection with respect to the electronic device 30, using the received Wi-Fi Config.

In step ST13, the Wi-Fi communication unit 413 of the electronic device 30 outputs the connection request received from the information processing apparatus 50 to the camera control unit 45.

In step ST14, the camera control unit 45 performs the Wi-Fi certification. In addition, the Wi-Fi certification may be performed by the Wi-Fi communication unit 413.

In step ST15, the camera control unit 45 outputs a certification result to the Wi-Fi communication unit 413.

In step ST16, the Wi-Fi communication unit 413 transmits the certification result to the information processing apparatus 50. In step ST17, the information processing apparatus 50 completes the Wi-Fi connection according to a certification success. Then, the electronic device 30 and the information processing apparatus 50 execute the link function using the Wi-Fi communication.

In addition, the electronic device 30 and the information processing apparatus 50 may be linked using the Wi-Fi communication or the like, and the processing performed until the link function of the electronic device and the information processing apparatus starts is not limited to the sequence processing illustrated in FIG. 3.

Figure 4:
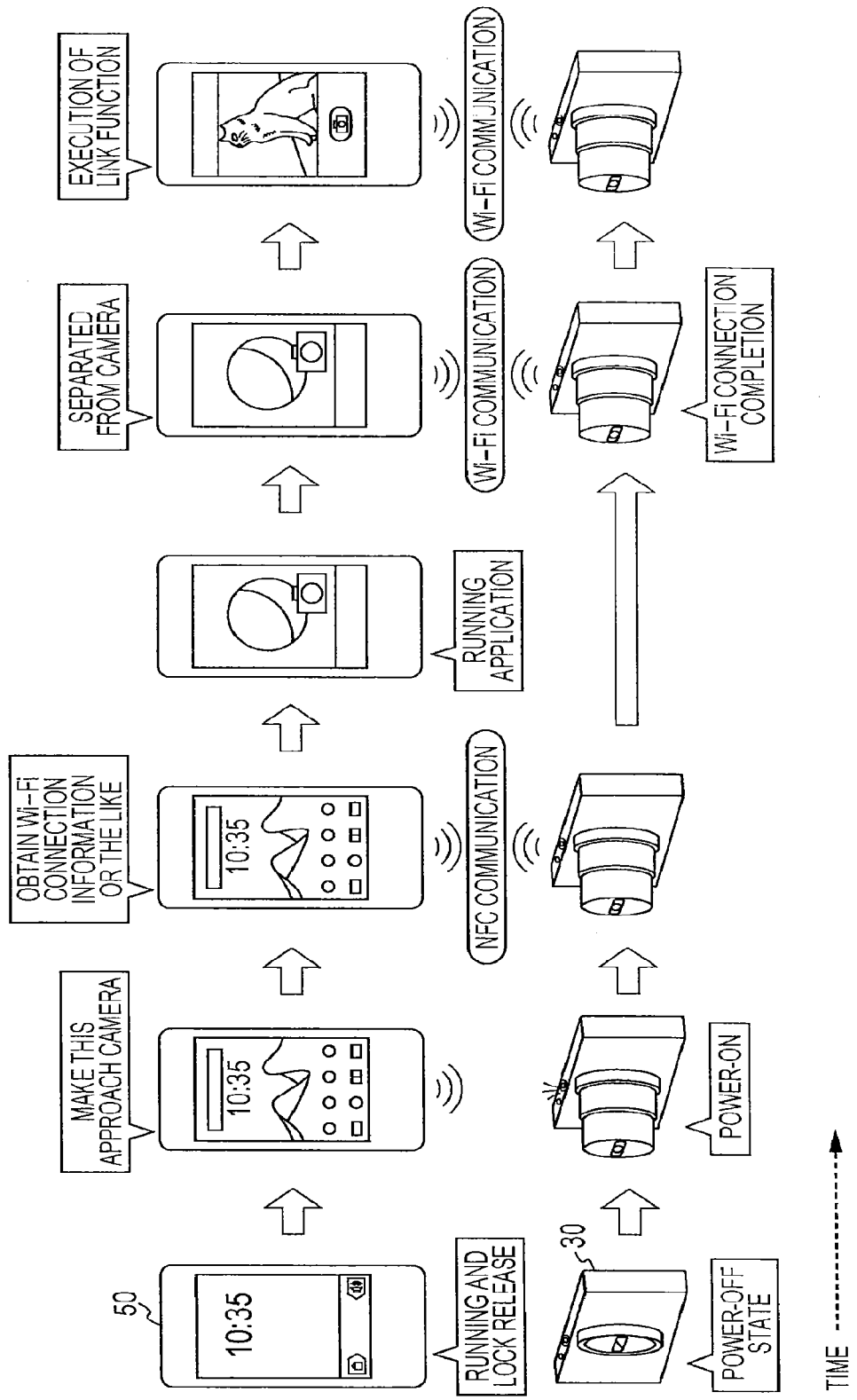
FIG. 4 is a state transition diagram for describing a flow of a series of operations of an electronic device and an information processing apparatus.

FIG. 4 is a state transition diagram for describing a flow of a series of operations of the electronic device and the information processing apparatus. If the information processing apparatus 50 which has already started approaches the electronic device 30 in a state of power being off, power of the electronic device 30 turns on (power on) using the NFC communication. In addition, at the time when the power is on, the imaging preparation operation such as lens projection of the imaging optical system block 31 or lighting of a power lamp of the display unit 35 is performed, in the electronic device 30.

Next, the information processing apparatus 50 which approaches the electronic device 30 obtains the connection information (information such as ID or a PassKey) for performing the wireless communication connection of the Wi-Fi or the like, or the information (such as a package name) of the run application from the electronic device 30, using the NFC communication.

Then, the information processing apparatus 50 displays a running screen of the application by running a predetermined application, based on the application information obtained from the electronic device 30.

Then, if the Wi-Fi communication connection with the information processing apparatus 50 is completed based on the connection information obtained from the electronic device 30, the link function of the electronic device 30 and the information processing apparatus 50 is executed using the Wi-Fi communication, even if the information processing apparatus 50 is separated from the electronic device 30. As an example of the link function, there is a remote control function with respect to the electronic device 30, a through image generated by the electronic device 30, a function that the captured image is displayed in the information processing apparatus 50, or the like. For example, a user installs the electronic device 30 in a place in which a desirable captured image is obtained, confirms the through image in the information processing apparatus 50, and then can remotely perform an imaging instruction by manipulating imaging buttons displayed on the screen of the information processing apparatus 50.

In this way, as the user simply makes the information processing apparatus 50 approach the electronic device 30, a series of operations such as a power-on control of the electronic device, the running of application, the connection establishment of the Wi-Fi communication, and link function execution is automatically performed.

3-2. With Regard to Time Setting Operation

In the time setting system, after the link function of the electronic device 30 and the information processing apparatus 50 is executed, the time of the electronic device 30 is set using the time information transmitted from the information processing apparatus 50 using the Wi-Fi communication. For example, if the Wi-Fi connection with the information processing apparatus 50 is completed, the camera control unit 45 of the electronic device 30 outputs device information indicating that it is possible for the electronic device 30 to set time according to the time information from the information processing apparatus 50. When discerning that the electronic device 30 which is Wi-Fi-connected is a device where time can be set, the information processing apparatus 50 performs a time setting instruction with respect to the electronic device 30. The information processing apparatus 50 includes the time information indicating the present time in the time setting instruction, and the electronic device 30 performs time updating using the time information included in the time setting instruction. In addition, in the following description, the time indicated by the time information included in the time setting instruction is referred to as instruction time. In addition, in the time setting instruction, the time information itself indicating the instruction time may be used as the time setting instruction.

Figure 5:
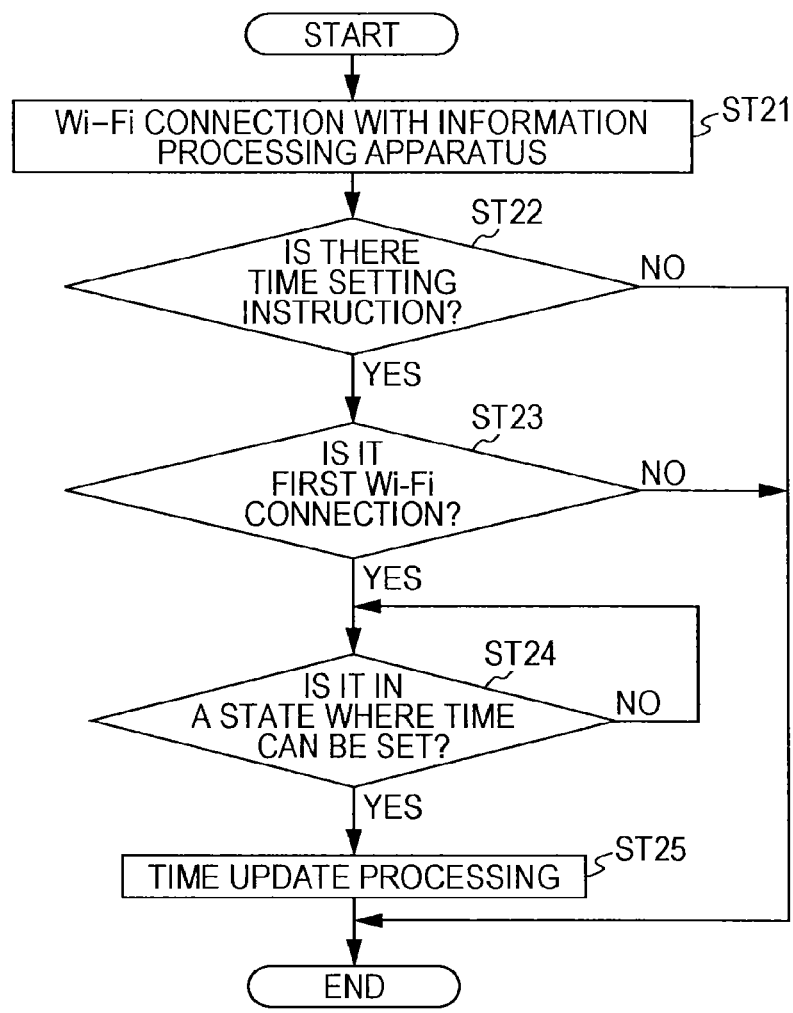
FIG. 5 is a flowchart exemplifying time setting processing of an electronic device.

FIG. 5 is a flowchart exemplifying time setting processing in an electronic device. In step ST21, the camera control unit 45 forms the Wi-Fi connection with the information processing apparatus 50. The camera control unit 45 forms the Wi-Fi connection with the information processing apparatus 50, and starts the Wi-Fi communication with the information processing apparatus 50, using the information obtained by the above-described Wi-Fi certification, and thus proceeds to step ST22.

In step ST22, the camera control unit 45 discerns whether or not there is the time setting instruction. The camera control unit 45 proceeds to step ST23 when receiving the time setting instruction from the information processing apparatus 50, and ends the processing when receiving no time setting instruction.

In step ST23, the camera control unit 45 discerns whether or not the Wi-Fi connection is a first Wi-Fi connection after the running. The camera control unit 45 proceeds to step ST24 when the Wi-Fi connection formed in step ST21 is a Wi-Fi connection of a first time after the running of the electronic device 30, and ends the processing when the Wi-Fi connection formed in step ST21 is a Wi-Fi connection of a second time or later.

In step ST24, the camera control unit 45 discerns whether or not an operation state of the electronic device 30 is in a state where time can be set. The camera control unit 45 proceeds to step ST25 when the operation state of the electronic device 30 is in a state where the time can be set, and returns to step ST24 when the operation state of the electronic device 30 is not in a state where the time can be set. The electronic device 30 discerns that the operation state of the electronic device 30 is not in a state where the time can be set, when the processing which uses the time information is performed, for example when the processing in which the still image or the moving image is recorded together with imaging time point is performed. In addition, when the processing using the time information is not performed, for example, when the processing in which the still image or the moving image is recorded together with imaging time point is completed, even if the time of the timekeeping unit 37 is changed, the processing operation or the like is not influenced, and the electronic device 30 discerns that the operation state of the electronic device 30 is in a state where the time can be set.

In step ST25, the camera control unit 45 performs the time updating. The camera control unit 45 corrects the instruction time indicated by the time setting instruction supplied from the information processing apparatus 50, according to the elapse of time. When performing the time updating, the camera control unit 45 updates the time of the timekeeping unit 37 by using the corrected instruction time which is corrected by the length of the elapse of time between the time setting instruction and the time updating is performed.

Figure 6:
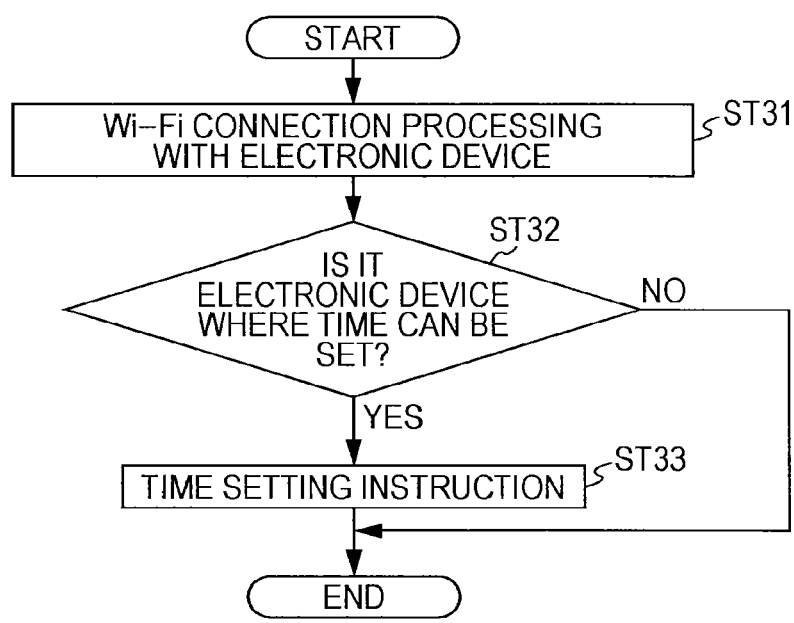
FIG. 6 is a flowchart exemplifying processing of an information processing apparatus.

FIG. 6 is a flowchart exemplifying processing of the information processing apparatus according to the time setting. In step ST31, the information processing apparatus 50 forms the Wi-Fi connection with the electronic device 30. The information processing apparatus 50 forms the Wi-Fi connection with the electronic device 30, using the information obtained by the above-described NFC communication, and proceeds to step ST32.

In step ST32, the information processing apparatus 50 discerns whether or not the electronic device 30 is a device where the time can be set. The information processing apparatus 50 discerns whether or not the electronic device which is Wi-Fi-connected is a device where time can be set. The information processing apparatus 50 proceeds to step ST33 when the connected electronic device is discerned to be the device where time can be set, and ends the processing when the connected electronic device is discerned not to be the device where time can be set.

In step ST33, the information processing apparatus 50 performs the time setting instruction. The information processing apparatus 50 generates the time setting instruction including the time information indicating the present time, transmits the generated time setting instruction to the electronic device 30 using the Wi-Fi communication, and then ends the processing.

Operation Example of Time Setting System

Figure 7:
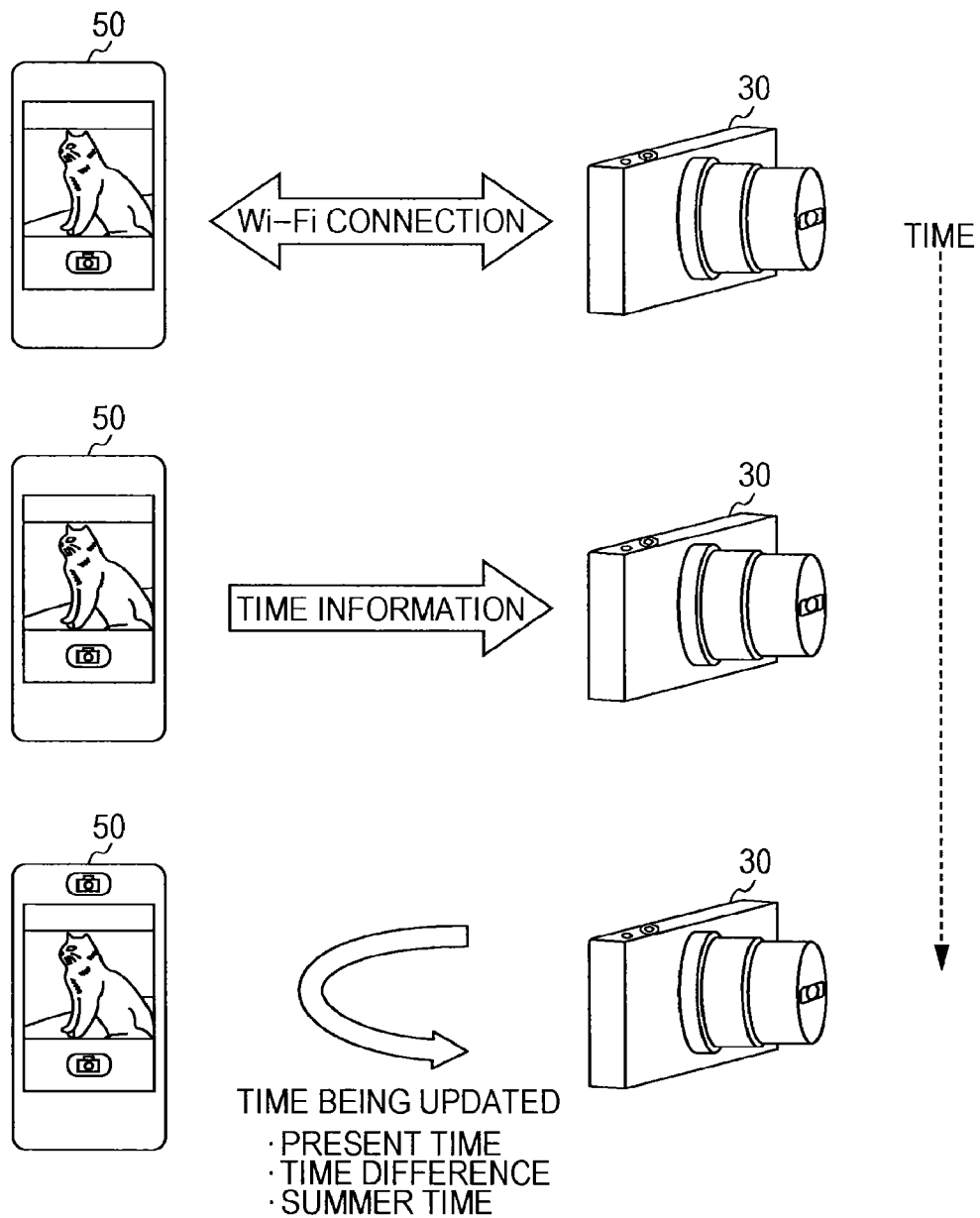
FIG. 7 sequentially illustrates an operation of the time setting system.

FIG. 7 sequentially illustrates the operation of the time setting system. The time setting system 10 forms the Wi-Fi connection between the electronic device 30 and the information processing apparatus 50. Next, the time setting instruction including the time information is transmitted from the information processing apparatus 50 to the time settable electronic device 30. When being in a state where the time can be set, the electronic device 30 performs the time updating. The time updating is not limited to a case where updating of the present time is performed, and may be updating of a time difference with regard to a reference time point, updating of Daylight Saving Time, and the like.

Figure 8:
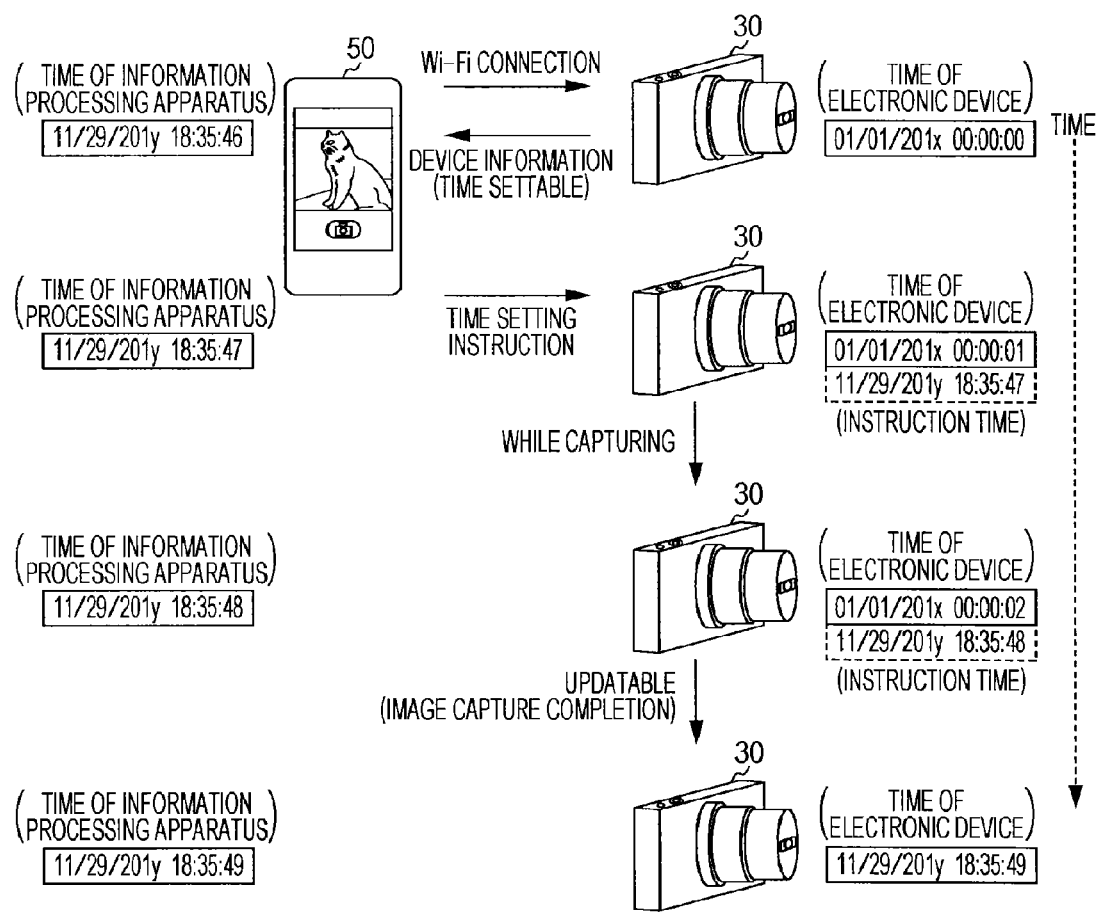
FIG. 8 illustrates an operation example of the time setting system.

FIG. 8 illustrates an operation example of the time setting system. If the Wi-Fi connection between the electronic device 30 and information processing apparatus 50 is formed, the electronic device 30 outputs device information to the information processing apparatus 50 indicating that the electronic device 30 is a device where time can be set. The information processing apparatus 50 outputs the time setting instruction to the electronic device 30 because the time setting is possible in the electronic device 30. In addition, the time setting instruction includes the time information in which the present time "201y/11/29 18:35:47" of the information processing apparatus 50 is set as the instruction time. In addition, for example, the time of the electronic device 30 which receives the time setting instruction is set to "201x/01/01 00:00:01".

For example, when capturing images, the electronic device 30 discerns that it is in a state unable to perform the time setting, and does not perform time updating processing. In addition, the electronic device 30 corrects the instruction time according to the elapse of time. Thus, when the time necessary for generation and communication of the time setting instruction and the like is ignored, the instruction time corrected in the electronic device 30 becomes the time synchronized to the information processing apparatus 50.

Then, when being in a state where the time can be set after the imaging is completed, the electronic device 30 updates the time of the electronic device 30, using the instruction time after the updating. Thus, the electronic device 30 updates the time "201x/01/01 00:00:02" to the time "201y/11/29 18:35:48", whereby the timekeeping is performed.

In this way, when being in a state where the time can be set by obtaining the time information from the information processing apparatus 50 connected by the wireless communication, the time of the timekeeping unit 37 in the electronic device 30 is updated by the camera control unit 45 using the obtained time information. Thus, even if a time setting manipulation is not performed in the electronic device 30, the time of the electronic device 30 can be easily set by simply making the electronic device 30 approach the information processing apparatus 50, whereby they connect to each other. In addition, when the information processing apparatus 50 performs an operation at an exact time according to the time information obtained from outside, the time of the electronic device 30 can be easily set to the exact time.

In addition, while the electronic device 30 runs, timekeeping of the time of the timekeeping unit 37 is performed, and at the time of the wireless connection of the second time or later, the timekeeping is performed using the time updated by the wireless connection of the first time. Thus, the electronic device 30 performs the time updating in the wireless communication of the first time, and does not perform the time updating in the wireless connection performed thereafter. Thus, the time updating processing can be prevented from being unnecessarily repeated.

In addition, as the electronic device 30 transmits the device information indicating that the electronic device 30 is the device where time can be set to the information processing apparatus 50, the electronic device 30 performs the time updating using the time information supplied from the information processing apparatus 50. For this reason, the time setting instruction can be prevented from performing with respect to the electronic device unable to perform the time setting from the information processing apparatus 50, whereby time information communication can be prevented from being uselessly performed.

Further, the timekeeping unit 37 of the electronic device 30 performs the timekeeping of the time by receiving the electric power from only the power supply unit 36 which operates the electronic device 30. For this reason, if the electric power is not supplied due to a shortage of the electric power of the power supply unit 36, the timekeeping of the time stops. However, by simply making the electronic device 30 which is operable by the electric power supplied from the power supply unit 36 approach the information processing apparatus 50, the time setting of the electronic device 30 can be easily performed, as described above. Thus, for example, necessity that a timekeeping-purpose secondary battery for operating the timekeeping unit 37 is installed in the electronic device 30 is reduced, and the electronic device 30 can be installed at a low cost without the timekeeping-purpose secondary battery being installed. In addition, it is unnecessary to perform a battery exchange due to a remaining amount decrease or the like of the timekeeping-purpose secondary battery.

3-3. With Regard to Another Time Setting Operation

By the way, in a case where the time of the information processing apparatus 50 is not exact, the time setting instruction indicating inexact time with respect to the electronic device 30 is performed. In this case, even if the instruction time notified from the information processing apparatus 50 is clearly erroneous, the time of the electronic device 30 is updated to the erroneous time. Therefore, when the instruction time is not within a predetermined period which is set in advance, the electronic device 30 may perform the time updating without using the instruction time.

Figure 9:
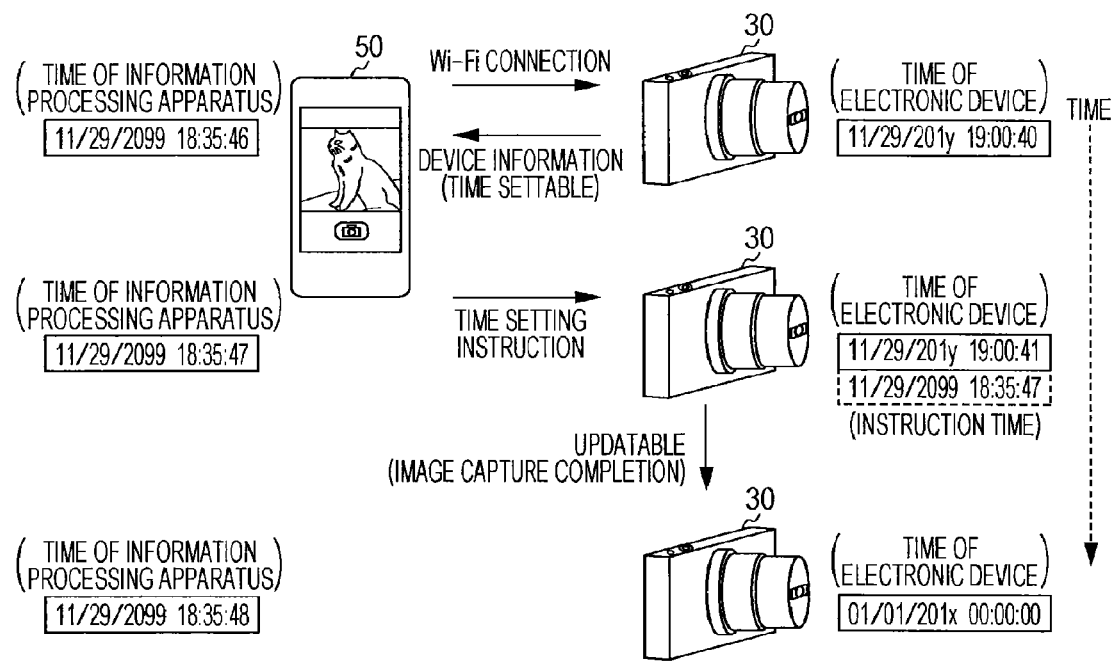
FIG. 9 illustrates another operation example of the time setting system.

FIG. 9 illustrates another operation example of the time setting system. If the Wi-Fi connection between the electronic device 30 and the information processing apparatus 50 is formed, the electronic device 30 outputs the device information indicating that it is possible for the time setting in the information processing apparatus 50. The information processing apparatus 50 outputs the time setting instruction to the electronic device 30 because the time setting is possible in the electronic device 30. In addition, the time setting instruction includes the instruction time information in which the time "2099/11/29 18:35:46" of the information processing apparatus 50 is set as the instruction time. In addition, for example, the time of the electronic device 30 which receives the time setting information is set to "201y/11/29 19:00:40".

For example, when capturing images, the electronic device 30 discerns that it is in a state unable to perform the time setting, and does not perform the time updating processing. In addition, the electronic device 30 corrects the instruction time according to the elapse of time.

Then, when being in a state where the time can be set after the imaging is completed, the electronic device 30 updates the time of the electronic device 30, using the instruction time after the updating. Here, when correction instruction time is the time "2099/11/29 18:35:47" that is not included in the predetermined period which is set in advance, the electronic device 30 updates the time of the electronic device 30 to the time specified in advance, such as initial setting time "201x/01/01 00:00:00". In addition, a relationship between "x" and "y" in the above-described time is "x<y".

In this way, when the instruction time indicated by the time setting instruction is not within the predetermined period set in advance, the time of the electronic device 30 is updated to the time specified in advance. Thus, for example, the electronic device 30 is prevented from being set to the clearly erroneous time.

By the way, a series of processings described in the specification can be executed by hardware, software or a combination of both. When the processing is performed by the software, a program in which a processing sequence is recorded is executed by being installed in a memory within a computer built in a dedicated hardware. In addition, the program can be executed by being installed in a general-purpose computer capable of executing various kind of processing.

For example, the program can be recorded in advance in a hard disk, an SSD (Solid State Drive) or a ROM (Read Only Memory) as a record medium. Alternatively, the program can be stored (recorded) temporarily or permanently in a removable record medium such as a flexible disk, a CD-ROM (Compact Disk Read Only Memory), an MO (Magneto Optical) disk, a DVD (Digital Versatile Disk), a BD (Blu-Ray Disk) (registered trademark), a magnetic disk, or a semiconductor memory card. Such a removable record medium can be provided as so-called package software.

In addition, the program is installed in the computer from the removable record medium, and also may be transferred through wire or wirelessly to the computer via a network such as a LAN (Local Area Network) or the Internet from a download site. The computer can receive the program transferred in this manner, and install the program in the record medium such as an embedded hard disk.

In addition, the present technology should not be construed as limited to the embodiments of the above-described technology. The embodiments of this technology disclose the present technology in the form of examples, and it is evident that those skilled in the art can make modifications or substitutions to the embodiments without departing from gist of the present technology. In other words, in order to determine the gist of the present technology, the claims should be referred to.

In addition, the electronic device of the present technology can also take the following configuration.

(1) The electronic device includes, a communication unit that performs communication with an external apparatus; a timekeeping unit that performs timekeeping of time; and a control unit, after completion of a connection with the external apparatus using the communication unit, updates time of the timekeeping unit using time information when being in a state where time can be set by obtaining the time information from the external apparatus.

(2) The electronic device according to (1) in which the control unit updates the time of the timekeeping unit after the electronic device runs and a first connection with the external apparatus using the communication unit is completed.

(3) The electronic device according to (1) or (2) in which the control unit transmits device information indicating that the electronic device is in a state where the time can be set to the external apparatus from the communication unit after the connection with the external apparatus is completed, and obtains the time information supplied from the external apparatus according to device information transmission.

(4) The electronic device according to any one of (1) to (3) in which the control unit changes the time of the timekeeping unit to time specified in advance, when time indicated by the time information is not within a predetermined time.

(5) The electronic device according to any one of (1) to (4) in which the communication unit performs a wireless communication with the external apparatus.

(6) The electronic device according to (5) in which the control unit causes the electronic device to run using short distance wireless communication with the external apparatus, and obtains the time information using the wireless communication with a longer communication distance than that of the short distance wireless communication.

(7) The electronic device according to any one of (1) to (6) in which the control unit sets a state where an operation using information indicating that the time of the timekeeping unit is completed, as in a state where the time can be set.

(8) The electronic device according to any one of (1) to (7) in which the timekeeping unit performs the timekeeping of time by receiving electric power from only a power supply unit which operates the electronic device.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device, comprising:
circuitry that
performs timekeeping of time,
performs wireless communication with an application in a smart phone,
transmits an indication that time can be set to the application in the smart phone,
receives a time information from the application in the smart phone via the wireless communication corresponding to the indication,
discerns whether an operation state of the electronic device is an operation state where time can be set, and
sets a time of the electronic device according to the operation state.

2. The electronic device according to claim 1, wherein the circuitry automatically sets the time of the electronic device upon completion of the wireless communication with the smart phone.

3. The electronic device according to claim 1, wherein the wireless communication between the circuitry of the electronic device and smart phone is initiated when the electronic device and the smart phone are within a predetermined distance.

4. The electronic device according to claim 3, wherein the circuitry sets the time of the electronic device when the electronic device and the smart phone are within the predetermined distance.

5. The electronic device according to claim 1, wherein the circuitry sets the time in the electronic device with a predetermined timing advance.

6. A method for an electronic device, comprising:
performing, with circuitry, timekeeping of time;
performing, with the circuitry, wireless communication with an application in a smart phone;
transmitting, with the circuitry, an indication that time can be set to the application in the smart phone;
receiving, with the circuitry, a time information from the application in the smart phone via the wireless communication;
discerning, with the circuitry, whether an operation state of the electronic device is an operation state where time can be set; and
setting, with the circuitry, a time of the electronic device according to the operation state.

7. The method according to claim 6, further comprising:
automatically setting the time of the electronic apparatus upon completion of the wireless communication with the smart phone.

8. The method according to claim 6, further comprising:
initiating the wireless communication between the electronic device and the smart phone when the electronic device and the external apparatus are within a predetermined distance.

9. The method according to claim 8, further comprising:
setting the time of the electronic device when the electronic device and the smart phone are within the predetermined distance.

10. The method according to claim 6, further comprising:
setting the time in the electronic device with a predetermined timing advance.

11. A non-transitory computer-readable medium encoded with computer-readable instructions that, when executed by circuitry of an electronic device, cause the circuitry of the electronic device to perform a method, comprising:
performing timekeeping of time;
performing wireless communication with an application in a smart phone;
transmitting an indication that time can be set to the application in the smart phone;
receiving a time information from the application in the smart phone via the wireless communication;
discerning whether an operation state of the electronic device is an operation state where time can be set; and
setting a time of the electronic device according to the operation state.

12. The non-transitory computer-readable medium according to claim 11, further comprising:
automatically setting the time of the electronic apparatus upon completion of the wireless communication with the smart phone.

13. The non-transitory computer-readable medium according to claim 11, further comprising:
initiating the wireless communication between the electronic device and the smart phone when the electronic device and the external apparatus are within a predetermined distance.

14. The non-transitory computer-readable medium according to claim 13, further comprising:
setting the time of the electronic device when the electronic device and the smart phone are within the predetermined distance.

15. The non-transitory computer-readable medium according to claim 11, further comprising:
setting the time in the electronic device with a predetermined timing advance.

* * * * *